United States Patent
Bourdeau et al.

(10) Patent No.: US 9,016,331 B2
(45) Date of Patent: Apr. 28, 2015

(54) METHOD OF INHIBITING SURFACE GELATION OF AN UNCURED GELCOAT COMPOSITION

(71) Applicant: Valspar Sourcing, Inc., Minneapolis, MN (US)

(72) Inventors: Michael J. Bourdeau, Prior Lake, MN (US); Ranjit R. Pachha, St. Paul, MN (US); Michael A. Contos, Inver Grove Heights, MN (US); Vincent Benitez, Irving, TX (US)

(73) Assignee: Valspar Sourcing, Inc., Minneapolis, MN (US)

( * ) Notice: Subject to any disclaimer, the term of this patent is extended or adjusted under 35 U.S.C. 154(b) by 208 days.

(21) Appl. No.: 13/713,342

(22) Filed: Dec. 13, 2012

(65) Prior Publication Data

US 2013/0160404 A1 Jun. 27, 2013

Related U.S. Application Data

(60) Provisional application No. 61/579,763, filed on Dec. 23, 2011.

(51) Int. Cl.
*C08K 5/3432* (2006.01)
*B65B 33/00* (2006.01)

(52) U.S. Cl.
CPC ............... *C08K 5/3432* (2013.01); *B65B 33/00* (2013.01)

(58) Field of Classification Search
CPC .......................................................... B65B 1/02
USPC .............................. 53/452; 141/9, 11, 69, 104
See application file for complete search history.

(56) References Cited

U.S. PATENT DOCUMENTS

| | | | | |
|---|---|---|---|---|
| 3,166,529 A | * | 1/1965 | Tamblyn et al. | 524/83 |
| 3,288,735 A | * | 11/1966 | Watanabe et al. | 264/121 |
| 3,477,981 A | * | 11/1969 | Grieco et al. | 523/439 |
| 3,553,292 A | * | 1/1971 | Stahly | 525/26 |
| 3,553,293 A | * | 1/1971 | Stahly | 525/21 |
| 3,555,116 A | * | 1/1971 | Stahly | 525/26 |
| 3,631,217 A | * | 12/1971 | Rubenold | 525/15 |
| 3,657,387 A | * | 4/1972 | Stahly | 525/11 |
| 3,737,480 A | * | 6/1973 | Stahly | 523/508 |
| 5,314,720 A | * | 5/1994 | Gan et al. | 427/386 |
| 2006/0167208 A1 | | 7/2006 | Garner et al. | |
| 2007/0001343 A1 | | 1/2007 | Pulman et al. | |
| 2007/0154668 A1 | * | 7/2007 | Rhee et al. | 428/35.7 |
| 2011/0028659 A1 | * | 2/2011 | Huang et al. | 525/368 |
| 2011/0256080 A1 | * | 10/2011 | Kozachek et al. | 424/61 |
| 2013/0034512 A1 | * | 2/2013 | Kozacheck et al. | 424/61 |
| 2013/0160404 A1 | * | 6/2013 | Bourdeau et al. | 53/452 |

FOREIGN PATENT DOCUMENTS

WO    WO 2008027979 A2 *  3/2008 .............. C09D 7/12

* cited by examiner

*Primary Examiner* — Kevin P Shaver
*Assistant Examiner* — Andrew Schmid

(57) ABSTRACT

A method to prevent gelation of an uncured gelcoat composition during storage is described. The method includes applying a gelation inhibitor to the surface of a gelcoat composition in the container to prevent premature gelation. The gelation inhibitor additionally prevents the formation of a crust on the inner surface of storage container lids.

14 Claims, No Drawings

METHOD OF INHIBITING SURFACE GELATION OF AN UNCURED GELCOAT COMPOSITION

This application claims the benefit of U.S. Provisional Application No. 61/579763, filed Dec. 23, 2011, the entire content of which is incorporated herein by reference.

BACKGROUND

Coated, molded articles, often fiber-reinforced, typically are made by spreading a gel coat composition over the surface of a mold having a surface corresponding to the article in negative relief. After cure, the gel coat composition, becomes the outermost layer of the molded article and will become exposed to the environment. The gel coat composition is spread across the mold surface by any one of a number of techniques, and usually as a relatively thick layer, e.g., up to about a 0.8 mm thick wet coating. This can help maximize weather and wear resistance, and if the molded article is fiber-reinforced, can help mask the fiber reinforcement pattern which may show through the gel coat due to inherent resin shrinkage that occurs around the fibers during cure. After the gel coat composition is applied to the mold surface, it is at least partially cured. A strengthening plastic support, optionally fiber-reinforced, is then applied behind the partially or fully cured gel coat composition using any one of a number of techniques (e.g., by brushing, hand lay-up, or spraying for open mold processes, or by casting for closed mold processes), and the resulting laminate structure is cured and demolded. Curing can be promoted through the use of free radical polymerization initiators.

Gel coat compositions are typically made of unsaturated polyester resins, extenders and reactive monomers as diluents. Due to the reactive nature of these monomers, uncured gel coat compositions have a limited shelf-life or storage life, and the material will eventually begin to gel. As gel coat compositions are applied as liquid, surface gelation renders the compositions unusable. The shelf-life of the composition becomes shorter as storage temperature increases. Therefore, there is a need for gel coat compositions with extended-shelf life at various storage temperatures.

SUMMARY

The present invention provides a method to inhibit surface gelation of an uncured gelcoat composition and thereby extend the shelf-life of the gelcoat composition.

In one embodiment, the method described herein includes the steps of providing a storage container, filling the container with the gelcoat composition and applying a gelation inhibitor to the surface of the gelcoat composition.

In another embodiment, the method described herein inhibits the formation of crust on the interior lid of a gelcoat composition storage container. The method includes the steps of providing a storage container, filling the container with the gelcoat composition and applying a gelation inhibitor to the surface of the gelcoat composition.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

SELECTED DEFINITIONS

Unless otherwise specified, the following terms as used herein have the meanings provided below.

As used herein, the term "gelcoat" refers to a composition applied to the surface of a mold having a surface corresponding to the shape of an article in negative relief. On curing, the gelcoat composition becomes a cured coating and forms the outermost layer of the article. The coating can be opaque or clear. The term "opaque cured coating", as used herein, refers to a coating that when applied to a desired wet thickness, typically from about 0.5 mm to about 0.8 mm, has sufficient hiding power to obscure underlying patterns on a Leneta chart when observed under typical light conditions.

The term "gelation," as used herein, means the conversion or transition of the gelcoat composition from a liquid state to a jelly state, i.e. a colloidal state where the dispersed phased has combined with the dispersion medium to produce a semi-solid material. As used herein, the term "inhibitor" or "gelation inhibitor" includes one or more chemicals that can impede or prevent premature gelation of the composition. By premature gelation is meant the progression or conversion of the liquid gelcoat composition to a jelly state prior to curing.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.)

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

Unless otherwise indicated, a reference to a "(meth)acrylate" compound (where "meth" is bracketed) is meant to include both acrylate and methacrylate compounds.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The invention described herein features a method to inhibit surface gelation of an uncured gelcoat composition. The method preferably includes providing a storage container for the gelcoat composition, filling the storage container with the composition, and applying a gelation inhibitor to the upper surface of the gelcoat composition. When applied to the gelcoat composition as described herein, the gelation inhibitor delays gelling of the composition and thereby extends the shelf-life and/or storage stability of the gelcoat composition.

In an aspect, the methods described herein are directed to inhibiting surface gelation of a gelcoat composition. A gelcoat (also called a gel coat) includes a prepromoted resin, preferably a polyester, and can be colored or clear. Colored gelcoat compositions preferably contain pigments and extended fillers, whereas clear gelcoat compositions do not. In a preferred aspect, a gelcoat composition includes an unsaturated polyester resin, reactive diluent, thixotropic agent(s), promoter, inhibitor, and if a colored gelcoat, sufficient pigment to provide an opaque cured coating.

In an aspect, the gelcoat composition described herein preferably includes a polyester resin, more preferably an unsaturated polyester resin. The polyester resin preferably has a weight average molecular weight (Mw) of about 1000 to about 20,000, more preferably about 1300 to about 11,000, and most preferably about 1500 to about 8000, or a number average molecular weight (Mn) of about 400 to about 10,000, more preferably about 800 to about 3600, and most preferably about 1000 to about 3000. The unsaturated polyester resin preferably represents about 25 wt % to about 94 wt %, more preferably about 30 wt % to about 89 wt %, and most preferably about 40 wt % to about 79 wt % of the gelcoat composition.

A variety of unsaturated polyester resins are suitable for use with the methods described herein. Preferably, the polyester resin is prepared by the condensation of one or more carboxylic acids with one or more alcohols, using esterification techniques known to those of skill in the art, and as further described in U.S. Patent Pub. No. 2007/0001343, the disclosure of which is fully incorporated herein by reference. Typical carboxylic acid components of the present invention may include unsaturated, saturated carboxylic acids, their derivatives, or combinations thereof. Examples of suitable unsaturated carboxylic acids and their derivatives include maleic acid, fumaric acid, chloromaleic acid, itaconic acid, citraconic acid, methyleneglutaric acid, mesaconic acid, acrylic acid, methacrylic acid, and esters or anhydrides thereof. Suitable saturated carboxylic acids for the esterification reaction include, for example, succinic acid, glutaric acid, d-methylglutaric acid, adipic acid, sebacic acid, pimelic acid, phthalic anhydride, o-phthalic acid, isophthalic acid, terephthalic acid, dihydrophthalic acid, tetrahydrophthalic acid, and the like. Suitable alcohols include, for example, ethylene glycol, 1,2-propylene glycol, propane-3-diol, 1,3-butylene glycol, butene-1,4-diol, hexane-1,6-diol, diethylene glycol, triethylene glycol, 2,2-dimethyl-1,3-propanediol (neopentyl glycol), 2-methyl 1,3-propanediol (MPDiol), polyethylene glycol, and the like. Representative carboxylic acids and alcohols are further described in U.S. Patent Pub. No. 2007/0001343, the disclosure of which is fully incorporated herein by reference.

In an aspect, the gelcoat composition described herein preferably includes a reactive diluent. Preferably, the reactive diluent represents about 5 wt % to about 50 wt %, more preferably about 10 wt % to about 45 wt %, and most preferably about 20 wt % to about 35 wt % of the gelcoat composition.

Suitable reactive diluents for the gelcoat compositions described herein include, for example, vinylbenzene(styrene monomer); methyl methacrylate (MMA); non-hazardous air pollutant (non-HAPs) reactive diluents such as substituted styrenes (e.g., vinyltoluene, para-tertiary-butylstyrene, para-methylstyrene or divinylbenzene); mono-, di-, and poly-functional esters of unsaturated monofunctional acids (such as acrylic acid and methacrylic acid) with alcohols or polyols having from 1 to about 18 carbon atoms; and mono-, di-, and poly-functional esters of unsaturated monofunctional alcohols with carboxylic acids or their derivatives having from 1 to about 18 carbon atoms. Other suitable reactive diluents include, for example, acrylates, methacrylates, and phthalates such as diallyl phthalate; triallylcyanurates; vinyl ethers; and the like. Representative acrylates and methacrylates include butanediol dimethacrylate, trimethylolpropane trimethacrylate, ethylene dimethacrylate (EGDMA), polyethylene glycol dimethacrylate (PEGDMA), polypropylene glycol dimethacrylate (PPGDMA), trimethylol propane trimethacrylate (TMPTMA), tetramethylol propane trimethacrylate, dipropylene glycol dimethacrylate, isodecyl methacrylate, 1,3-butylene glycol dimethacrylate, 2-hydroxy ethyl methacrylate (2-HEMA), 1,6 hexane diol dimethacrylate (HDODMA), trieththylene glycol dimethacrylate (TEGDMA), acetoacetoxyethyl methacrylate (AAEM) and the acrylate counterparts thereof. Mixtures of reactive diluents may be used. Preferred reactive diluents include styrene, methyl methacrylate, vinyltoluene, para-tertiary- butylstyrene, para-methylstyrene, EGDMA, 2-HEMA and mixtures thereof.

In an aspect, the gelcoat compositions described herein include promoters that help initiate and facilitate cure of the gelcoat. The promoters are typically electron-donating species that aid decomposition of an initiator or catalyst and speed curing at low temperatures, for example, at temperatures of about 0° C. to about 30° C. Preferably, the promoters are used in an amount of about 0.5 wt % to about 3 wt %, more preferably about 0.05 wt % to about 2 wt % of the gelcoat composition.

Suitable promoters for use in the gelcoat compositions described herein include, without limitation, metal compounds such as, for example, cobalt, manganese, potassium, iron, vanadium, copper, and aluminum salts of organic acids; amines such as, for example, dimethylaniline, diethylaniline, phenyl diethanolamine, dimethyl paratoluidine, and 2-aminopyridine; Lewis acids such as, for example, boron fluoride dihydrate and ferric chloride; bases such as, for example, tetramethyl ammonium hydroxide; quaternary ammonium salts such as, for example, trimethyl benzyl ammonium chloride and tetrakismethylol phosphonium chloride; sulfur compounds such as, for example, dodecyl mercaptan and 2-mercaptoethanol; dimethyl acetoacetamide; ethyl acetoacetate; methyl acetoacetate and mixtures thereof. For example, cobalt salts of organic acids may be used to facilitate the low temperature decomposition of peroxide catalysts and cure of the disclosed gel coat compositions. In an aspect, the gelcoat composition described herein preferably includes one or more promoters in an amount of about 0.01 to about 0.05 wt %, more preferably 0.01 to about 0.3 wt %, and most preferably about 0.01 to about 0.1 wt %.

The gelcoat compositions described herein may also include other additives familiar to those of skill in the art, including for example, thixotropes, pigments, extenders, suppressants, surfactants, air release agents, initiators, catalysts and the like. In an aspect, the gelcoat composition described herein includes one or more thixotropic agents. Suitable thixotropic agents include, for example, materials such as fumed silica, precipitated silica or hydrophobic silica which when added to the gel coat composition will change the slope of its rheology curve without undesirably degrading the properties of the cured gel coat composition. In an aspect, the thixotropic agent typically is used in an amount of about 0.5 to about 5 wt %, or about 0.5 to about 2.5 wt % of the gel coat composition.

In an aspect, the gelcoat compositions described herein include one or more pigments to impart color and opacity to the composition. Pigments are preferably obtained in the form of a paste or dispersion of the dry pigment in a suitable carrier, and are preferably present at about 15 wt % to about 40 wt % dry pigment solids based on weight of the dispersion. The dispersion preferably includes minor amounts of other components such as, for example, wetting agents, dispersing agents, inhibitors and the like. The pigments are preferably used in an amount sufficient to form an opaque cured coating at a desired thickness. Pigment dispersion weights are preferably about 1 wt % to about 30 wt %, more preferably about 5 wt % to about 20 wt %.

In an aspect, the gelcoat compositions described herein include extenders that improve the performance of the cured gelcoat composition, or lower the cost of the applied coating. Suitable extenders include chopped or milled fiberglass, talc, silicone dioxide, titanium dioxide, wollastonite, mica, alumina trihydrate, clay, calcium carbonate, magnesium carbonate, barium carbonate, calcium sulfate, magnesium sulfate and barium sulfate. Preferably, the extender is present at no more than about 2 wt %, and more preferably no more than about 1 wt % of the gelcoat composition.

Optionally, the gelcoat composition described herein includes suppressants that help reduce VOC emissions and include, for example, polyethers, polyether block copolymers and polyether polysiloxane block copolymers, alkoxylated alcohols, fatty acids, polyalkoxypolysiloxanes and the like. Suitable suppressants are further described in U.S. Pat. No. 5,874,503, incorporated herein by reference. Preferably, suppressants are present at about 0.05 wt % to about 4 wt %, more preferably at about 0.25 wt % to about 3 wt %, and most preferably at about 0.5 wt % to about 2 wt % of the gelcoat composition.

Optionally, the gelcoat composition described herein includes one or more surfactants that lower the surface tension of the cured gelcoat. Suitable surfactants include, for example, silicones such as dimethyl silicones, liquid condensation products of dimethylsilane diol, methyl hydrogen polysiloxanes, liquid condensation products of methyl hydrogen silane diols, dimethylsilicones, aminopropyltriethoxysilane and methyl hydrogen polysiloxanes, and fluorocarbon surfactants such as fluorinated potassium alkyl carboxylates, fluorinated alkyl quaternary ammonium iodides, ammonium perfluoroalkyl carboxylates, fluorinated alkyl polyoxyethylene ethanols, fluorinated alkyl alkoxylates, fluorinated alkyl esters, and ammonium perfluoroalkyl sulfonates. Preferred surfactants include BYK-306 silicone surfactant (BYK-Chemie USA, Inc.), DC100 and DC200 silicone surfactants (Dow Corning), the MODAFLOW series of additives (Solutia, Inc.) and SF-69 and SF-99 silicone surfactants (GE Silicones). The surfactant preferably is present at up to about 1 wt %, more preferably from about 0.01 wt % to about 0.5 wt % of the gelcoat composition.

In an aspect, the gelcoat compositions described herein optionally include air release agents, initiators or catalysts, and the like. Suitable air release agents include, for example, silicone or non-silicone materials including silicone defoamers, acrylic polymers, hydrophobic solids, and mineral oil based paraffin waxes. Preferably, the air release agent is present at up to about 1.5 wt %, more preferably up to about 1 wt %, and most preferably from about 0.1 to about 0.5 wt % of the gel coat composition.

Suitable initiators or catalysts include, for example, free-radical catalysts such as peroxide catalysts, azoalkane catalysts and commercially available initiators or catalysts, radiation-activated or heat-activated initiators or catalysts, and the like. A presently preferred initiator or catalyst is cumene hydroperoxide. Preferably, the initiator or catalyst is present at about 0.5 to about 3 wt %, more preferably at about 1 to about 2.5 wt %, and most preferably about 1.2 to about and 2 wt % of the unsaturated polyester resin in the gelcoat composition.

The gelcoat compositions described herein may be prepared, for example, by blending the unsaturated polyester resin with the remaining components in a convenient order. Methods for making and applying gelcoat compositions are known to those of skill in the art, and preferred methods are described in U.S. Patent Pub. No. 2007/0001343, incorporated herein by reference.

In the methods described herein, the uncured gelcoat composition is preferably placed or filled in a storage container. The storage container is preferably a reusable non- collapsible container of any configuration designed to protect the gelcoat composition contained therein from impact, vibration, climate, environmental or chemical contaminants, and the like, during handling, shipment and storage. Suitable storage containers for gelcoat compositions preferably have secure lids or covers to provide closed containers for storage, and include, without limitation, drums, bins, totes, carboys, and the like.

Uncured gelcoat compositions placed in storage containers have a limited shelf- life of about 30 to 90 days. While not intending to be bound by theory, it is believed that vapors of the reactive monomers, such as styrene and/or methyl methacrylate accumulate in the space between the gelcoat surface and the inner surface of the storage container lid. When these vapors come in contact with the promoters, such as, for example, cobalt and potassium, in the gelcoat composition, polymerization is initiated and leads to gelation of the composition. The rate of polymerization is dependent on the amount of promoter in the gelcoat composition, the reactivity of the unsaturated polyester resin used in the gelcoat, and the temperature of the container, with gelation occurring more quickly at higher initiator concentrations, higher temperatures, and with more reactive unsaturated polyester resins.

In an aspect, gelation of the uncured gelcoat composition at storage temperatures of 90° F. to 150° F. can occur in as little as 1-3 days, in the absence of a gelation inhibitor. The shelf life of a gelcoat composition stored at temperatures above 70° F. is expected to be significantly shorter than the shelf life at 70° F. or below.

To prevent gelation of the uncured gelcoat composition, standard practice in the industry is to place a polyethylene (PE) top sheet under the lid of the drum, such that the top sheet is laid on top of the gelcoat composition with edges of the PE topsheet hanging outside the drum. Without being limited to a theory, it is believed that the top sheet reduces the head space in the drum, where vapors of the reactive monomer typically collect. However, the placement of the PE top sheet is complicated and messy, and is not optimal for delaying or reducing surface gelation using such a top sheet. Premature gelation is still seen at storage temperatures of 90° F. to 150° F., even when a PE top sheet is used. In addition, premature gelation is common in high temperature environments or storage conditions.

Premature gelation may be prevented using solid or liquid free-radical inhibitors or scavengers, or combinations of solid and liquid inhibitors known in the art. However, these inhibitors are colored and may interfere with the appearance of a clear gelcoat composition. Moreover, the inhibitors tend to increase the time required for cure, and certain quinine inhibitors may have a negative effect on gelcoat weathering performance and are, therefore, not preferred.

In an embodiment, the present invention describes a method to inhibit surface gelation of an uncured gelcoat composition by adding a gelation inhibitor to the top surface of the composition in a storage container. Without being bound to theory, the gelation inhibitor behaves as a barrier between the monomer vapors and the promoter in the gelcoat composition and thereby prevents premature gelation of the uncured gelcoat composition. Without being bound to theory, due to the low volatility of the gelation inhibitor, vapors of the gelation inhibitor occupy headspace in the container between the gelcoat surface and the container lid and reduce the space available for vapors of the reactive monomer. Therefore, less reactive monomer vapor is present in the headspace, and possible homopolymerization of the reactive monomer is significantly reduced. Preferably, the gelation inhibitor is a solvent, more preferably a high volatile solvent. A "high volatile solvent" is typically a low-boiling solvent, i.e. a solvent with boiling point of about 80° C. Suitable high volatile solvents include, for example, substituted and unsubstituted C5 through C12 alkanes, substituted and unsubstituted C5 through C12 cycloalkanes, substituted and unsubstituted C2 through C8 ketones, substituted and unsubstituted C2 through C15 alcohols, substituted and unsubstituted esters of C2 through C12 carboxylic acids, substituted and unsubstituted aromatic compounds, substituted and unsubstituted C2 through C4 nitriles, substituted and unsubstituted C2 through C12 aliphatic ethers, substituted and unsubstituted aromatic ethers, and the like. In an aspect, the gelation inhibitor is preferably a low molecular weight ketone, more preferably acetone.

In an embodiment, the present invention describes a method to inhibit surface gelation of an uncured gelcoat composition by adding a gelation inhibitor to the top surface of the composition in a storage container. Preferably, the gelation inhibitor is present at about 0.1 wt % to about 0.80 wt %, preferably 0.25 wt % to about 0. 75 wt %, more preferably at about 0.30 wt % to about 0.70 wt %, and most preferably at about 0.25 to about 0.65 wt % of the gelcoat composition.

In an embodiment, the present invention describes a method to inhibit surface gelation of an uncured gelcoat composition by applying a gelation inhibitor to the top surface of the composition in a storage container. In an aspect, applying the gelation inhibitor refers to the process of introducing the gelation inhibitor on to the surface of the gelcoat composition, and can be accomplished in a variety of ways known to those of skill in the art. Preferably, the gelation inhibitor is poured onto the surface of the gelcoat composition at a fixed volume, more preferably at a volume necessary to cover the entire surface of the gelcoat composition, depending on the size and volume of the storage container used to store the uncured gelcoat composition. The inhibitor functions as a float on the surface of the gelcoat composition, and prevents contact between the reactive monomers and the promoter. A gelation inhibitor float that is too thick may cause solvent to be trapped in a finished surface or part after the gelcoat composition is cured, which would have an adverse impact on performance properties. Therefore, the operative thickness of the float is preferably about 0.05 to about 0.5 inches, more preferably at least 0.1 inches and most preferably at least about 0.25 inches.

In an embodiment, the present invention describes a method to prevent crust formation on the inner surface of the lid of a storage container that includes an uncured gelcoat composition. Without being bound to theory, it is believed that the reactive monomers condense on to the inner surface of the storage lid and ultimately form solid or semi-solid crystals, particles, stalactites and the like, giving the appearance of a solid crust on the lid, which is not preferred. Moreover, the solid crust may come into contact with the promoter in the gelcoat composition and cause premature gelation of the composition.

In an aspect, the present invention describes a method to inhibit crust formation on the inner surface of the lid of a storage container that includes an uncured gelcoat composition by adding a gelation inhibitor to the top surface of the composition in a storage container. Without being bound to theory, the gelation inhibitor serves to dissolve the solidified and/or crystallized reactive monomer s and/or gelcoat composition that collect on the lid, for example, because of splashing during transportation. Without being bound to theory, because the gelation inhibitor has low volatility, it refluxes between the gelcoat composition and the headspace in the gelcoat container. The gelation inhibitor then condenses on the container lid and sides of the container and dissolves any gelcoat composition collected in the lid and/or the sides, and drops it back into the liquid gelcoat composition, thereby leaving the lid and side surfaces of the container clean. Dissolving the solidified monomers and/or gelcoat with the gelation inhibitor prevents unsightly crust formation on the inner surface of the lid. Moreover, the gelation inhibitor prevents contact between the crystalline and/or solidified reactive monomers and the promoter in the gelcoat composition and thereby prevents premature gelation of the uncured gelcoat composition.

Preferably, the gelation inhibitor is a solvent, more preferably a high volatile solvent. A "high volatile solvent" is typically a low-boiling solvent, i.e. a solvent with boiling point of about 80° C. Suitable high volatile solvents include, for example, substituted and unsubstituted C5 through C12 alkanes, substituted and unsubstituted C5 through C12 cycloalkanes, substituted and unsubstituted C2 through C8 ketones, substituted and unsubstituted C2 through C15 alcohols, substituted and unsubstituted esters of C2 through C12 carboxylic acids, substituted and unsubstituted aromatic compounds, substituted and unsubstituted C2 through C4 nitriles, substituted and unsubstituted C2 through C12 aliphatic ethers, substituted and unsubstituted aromatic ethers, and the like. In an aspect, the gelation inhibitor is preferably a low molecular weight ketone, more preferably acetone.

In an embodiment, the present invention describes a method to inhibit crust formation on the inner surface of a container used to store an uncured gelcoat The method includes adding a gelation inhibitor to the top surface of the composition in a storage container. Preferably, the gelation inhibitor is present at about 0.25 wt % to about 0.75 wt %, more preferably at about 0.30 wt % to about 0.70 wt %, and most preferably at about 0.35 wt % to about 0.65 wt % of the gelcoat composition.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Missouri.

Example 1

Two identical batches of a commercial-grade gelcoat composition were made, placed in separate storage drums, and filled to identical volumes. The first drum then had a 0.35 wt % float of acetone poured on the top surface of the gelcoat composition, while the second drum received no additional treatment (i.e. no float). Both drums were placed in an oven maintained at 120° F. (approx. 49° C.) and periodically monitored for surface gelation. The drum receiving no additional treatment showed premature gelation in three days. The drum with a quarter-inch acetone float did not exhibit surface gelation even after 19 days in storage at high temperature.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A method to inhibit surface gelation of an uncured gelcoat composition, comprising:
   providing a storage container;
   filling the storage container with the gelcoat composition; and
   applying a gelation inhibitor to an upper surface of the gelcoat composition as a float having thickness of about 0.05 to 0.5 inches.

2. The method of claim 1, wherein the gelation inhibitor is a solvent selected from the group consisting of hydrocarbons, ketones, alcohols and glycols.

3. The method of claim 1, wherein the gelation inhibitor is a ketone.

4. The method of claim 3, wherein the gelation inhibitor is acetone.

5. The method of claim 1, wherein the gelation inhibitor is applied at a concentration of from about 0.25 wt % to about 0.75 wt % based on total weight of the gelcoat composition.

6. The method of claim 1, wherein inhibiting surface gelation extends shelf-life of the gelcoat composition by at least 30 days at 70° F.

7. The method of claim 1, wherein inhibiting surface gelation extends shelf-life of the gelcoat composition by at least 30 days at temperatures above 70° F.

8. The method of claim 7, wherein elevated temperature comprises temperature of about 80° F. up to about 140° F.

9. The method of claim 1, wherein applying the gelation inhibitor comprises pouring a fixed volume of the gelation inhibitor on top of the gelcoat composition.

10. The method of claim 1, wherein the gelcoat composition
    comprises about 25 wt % to about 94 wt % unsaturated polyester resin;
    about 0.05 wt % to about 3 wt % promoter to initiate and facilitate cure of the gelcoat composition; and
    about 5 wt % to about 50 wt % reactive diluent.

11. The method of claim 10, wherein the reactive diluent comprises one or more monomers selected from the group consisting of styrenes, acrylates, methacrylates, phthalates, cyanurates, vinyl ethers, alcohols, polyols, esters of unsaturated monofunctional alcohols with $C_1$-$C_{18}$ carboxylic acids, and mixtures thereof.

12. The method of claim 10, wherein the reactive diluent comprises one or more monomers selected from the group consisting of styrene, methyl methacrylate, vinyl toluene, p-tert-butyl-styrene, p-methyl styrene, 2-hydroxyethyl methacrylate, ethylene dimethacrylate, and mixtures thereof.

13. The method of claim 10, wherein the promoter comprises one or more compounds selected from the group consisting of metal compounds, amines, Lewis acids, quarternary ammonium salts, sulfur compounds, dimethyl acetoacetamide, ethyl acetoacetate, methyl acetoacetate, and mixtures thereof.

14. A method of inhibiting crust formation on at least an inner surface of a lid of a gelcoat storage container, comprising:
 providing a storage container;
 filling the storage container with the gelcoat composition; and
 applying a gelation inhibitor to an upper surface of the gelcoat composition as a float having thickness of about 0.05 to 0.5 inches.

* * * * *